United States Patent [19]

Dekeyser et al.

[11] Patent Number: 4,815,372
[45] Date of Patent: Mar. 28, 1989

[54] BALE LENGTH CONTROL FOR AGRICULTURAL BALERS

[75] Inventors: Willy R. E. Dekeyser, Diksmuide; Emiel R. L. Marichael, Tielt, both of Belgium

[73] Assignee: Ford New Holland, Inc., New Holland, Pa.

[21] Appl. No.: 16,690

[22] Filed: Feb. 19, 1987

[30] Foreign Application Priority Data

Feb. 27, 1986 [EP] European Pat. Off. ...... 86.200.302.7

[51] Int. Cl.⁴ .............................................. A01F 15/14
[52] U.S. Cl. ........................................... 100/4; 74/405
[58] Field of Search ............... 100/4, 22, 192; 74/405, 74/422, 31

[56] References Cited

U.S. PATENT DOCUMENTS

| 75,523 | 3/1868 | Chase | 74/31 |
| 664,100 | 12/1900 | Scott | 74/31 |
| 2,897,748 | 4/1959 | Nolt et al. | |
| 2,911,904 | 11/1959 | Weiss | |
| 3,221,639 | 12/1965 | Rimmey | 100/4 |
| 3,862,592 | 1/1975 | Freeman | 100/4 |
| 3,931,760 | 1/1976 | Cheatum | 100/4 |

FOREIGN PATENT DOCUMENTS

1920534 4/1969 Fed. Rep. of Germany .

Primary Examiner—Stuart S. Levy
Assistant Examiner—Katherine Matecki
Attorney, Agent, or Firm—Darrell F. Marquette; Frank A. Seemar; Larry W. Miller

[57] ABSTRACT

A baler comprises means for securing a completed bale of material and metering means for triggering the operation of the securing means. The metering means includes a pinion drivingly connectable with a trip arm. Relative driving movement between the trip arm and the pinion takes place on rotation of the pinion until the pinion engages a recess in the trip arm, at which point, operation of the securing means is triggered. The extent of the relative driving movement between the trip arm and the pinion is representative of a dimension of the bale being formed. The metering means further comprises a roller mounted on the trip arm at the entry of the recess for engaging the pinion when the pinion is at the point to enter the recess thereby breaking the driving connection between the pinion and the trip arm.

4 Claims, 3 Drawing Sheets

BALE LENGTH CONTROL FOR AGRICULTURAL BALERS

BACKGROUND OF THE INVENTION

This invention relates to agricultural balers and, more particularly, to such balers provided with mechanisms for controlling the length of bales being formed.

For many years, balers providing rectangular bales of crop material have been fitted with mechanisms for controlling the length of the bales being formed. Bales of the required length are being tied and then discharged from the machine. However, the accuracy of known bale length control mechanisms has been found lacking which until more recently has not been a particularly serious matter. With the advent of specialist equipment for handling bales, however, it has become necessary to control the length of bales more accurately because any significant variation may adversely affect the ability of the equipment to handle and/or transport the bales.

The variation in the length of a bale arises from the fact that a plunger is reciprocable within a bale case or chamber to compress individual wads of crop material, fed from a feed chamber, into an integral bale. When the bale length control mechanism is operated, the completed bale is tied in the time it takes for the plunger to undergo a full stroke so that, if the length control mechanism is operated late or early, then either one more or one less plunger stroke will take place, whereby the length of the bale will be greater or less by one wad of crop material usually of the order of 10 cms. Clearly, the length control mechanism could malfunction to the extent of allowing more than one extra or less plunger strokes but normally the discrepancy in length is due only to one extra stroke. This is because the length control mechanism is usually in the form of a trip mechanism and the latter often "hangs up" at the point of tripping, thus allowing the baler plunger to undergo a further stroke and thus add an extra wad of crop material to the otherwise completed bale.

Typically, the trip mechanism comprises a trip arm in the form of a sector member provided with a track (often toothed) which is cooperable with, and driven by, a rotary member (often a toothed wheel) which, in turn, is driven by a star wheel which extends into the bale chamber and is rotated by the bales being formed as they progress along the bale chamber.

SUMMARY OF THE INVENTION

According to the present invention, a baler includes means for securing a completed bale of material and metering means for triggering the operation of the securing means; the metering means includes a rotatable member drivingly connectable with a trip arm; relative driving movement between the trip arm and the rotatable member taking place on rotation of the rotatable member until said rotatable member engages a recess in the trip arm, at which point, operation of the securing means is triggered. The extent of the relative driving movement between the trip arm and the rotatable member being representative of a dimension of the bale being formed. The improvement comprises a roller mounted on the trip arm at the entry to the recess for engaging the rotatable member when the rotatable member is at the point to enter said recess, thereby breaking the driving connection between the rotatable member and the trip arm.

The provision of the roller is a simple but highly effective way of ensuring that the securing means is always triggered at the same point in the bale formation sequence, whereby bales of substantially constant length are produced.

DESCRIPTION OF THE DRAWINGS

An agricultural baler embodying the present invention will now be described in greater detail, by way of example, with reference to the accompanying drawings, in which.

DESCRIPTION OF THE PREFERRED EMBODIMENT

Figure 1:
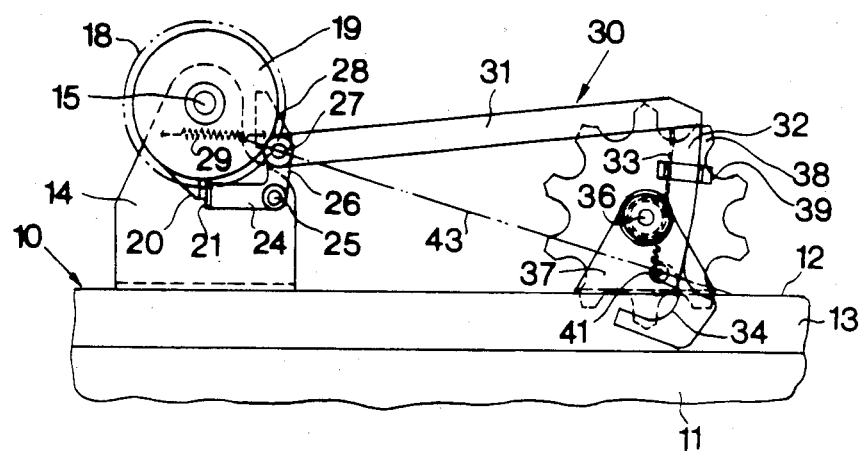
FIG. 1 is a fragmentary side elevational view of a portion of a baler.

The basic construction of the baler is conventional and only the top of the bale case or chamber 10 is shown in which a rectangular bale of crop material is formed and, when completed, is tied and eventually discharged from the machine. The tying operation is effected by securing means which may be in the form of conventional needles which enter the bale chamber 10 from below and carry twine with which the bale is wrapped; the twine being tied by one or more knotters (not shown), depending on how many strands of twine are employed across the bale. The knotters form part of the securing means.

The bale chamber 10 has two opposed sides 11, a top 12 and can be provided with angled corner reinforcing members 13 extending longitudinally of the bale chamber 10.

Mounted on top of the bale case are two brackets 14, only one of which is visible. A shaft 15 is journalled in the brackets 14 and extends therebetween transversely of the bale chamber 10. The knotters are carried and operated by the shaft 15 and driven from the baler operating power source by an endless chain (not shown) via a sprocket (also not shown). The pitch of circle of this sprocket is indicated at 18. A one-revolution clutch 19 is mounted on the shaft 15 and drivingly connects this sprocket to the shaft 15 for one revolution each time the clutch 19 is actuated. This then drives the knotters through one complete tying cycle which is accomplished during a return stroke of the plunger (not shown) operating within the bale chamber 10. The clutch 19 has a stop pawl 20 which normally engages a detent 21 to hold the clutch 19 disengaged. The detent 21 is provided at one end of generally horizontal arm 24 of a bell crank lever which is pivoted at 25 to the associated bracket 14. The other arm 26 of the bell crank lever extends generally vertically and carries a cam follower 28 which is arranged to engage a cam surface (not shown) on the continuously rotating portion of the clutch 19.

The upper end of the other arm 26 is connected to one end of a spring 29, the other end of which is attached to the associated bracket 14. The spring 29 operates to urge the bell crank lever 24,26 in a counterclockwise direction as seen in FIG. 1 about its pivot 25 so as to move the detent 21 downwardly out of engagement with the clutch stop pawl 20 and the cam follower 28 towards the cam surface for engagement therewith.

However, this action of the spring 29 is countered by a trip arm 30 which has a portion 31 pivotally attached at one end at 27 to the bell crank arm 26. A second portion 32 of the trip arm 30 is hooked with respect to the portion 31 and is in the form of a sector formed with teeth to provide a rack 33 on one edge. The outer end of the second trip arm portion 32 is formed with a trip notch or recess 34. The rack 33 normally engages a rotatable member such as pinion 35 fixed to a shaft 36 journalled in a pair of spaced brackets 37 attached to the top wall 12 of the bale chamber 10. The shaft 36 extends across the bale chamber 10 and also has fixed thereto a toothed metering wheel 38 (usually referred to as a star wheel) which extends through the top wall 12 into the bale chamber 10 for engagement with the bales progressing therealong.

The operation of the metering means is based on rotation of the metering wheel 38 which is effected by the bales moving progressively along the bale chamber 10 as they are being formed and in as much as the wheel 38 engages the top of these bales during said movement. Rotation of the wheel 38 results in rotation of the shaft 36 and hence rotation of the pinion 35 which, because it is held stationary, drives the rack 33, and hence the trip arm 30, counterclockwise about the pivot 27. The rack 33 is thus driven until the recess 34 in the trip arm portion 32 reaches the pinion 35, whereupon the spring 29 pulls the trip arm 30 to the left (as seen in FIG. 1), whereby the bell crank lever 24,26 is pivoted counterclockwise about the pivot 25 to move the arm 24 downwardly and thus disengage the detent 21 from the clutch stop pawl 20.

Incidentally, the movement of the rack 33 relative to the pinion 35 is guided by two discs 40 provided on either side of the pinion and engageable with respective sides of the trip arm portion 32.

Accordingly, the clutch 19 is now operated and thus drives the shaft 15 and hence the knotters which tie the twine or the like with which the completed bale has been wrapped. After the stop pawl 20 has rotated through approximately 90° (in the counterclockwise direction) the cam follower 28 is engaged by a rise in the cam surface (not shown) whereby the bell crank lever 24,26 is pivoted clockwise and drives the trip arm 30 to the right so as to disengage the recess 34 from the pinion 35 and allow the trip arm 30 to drop back to its initial position of FIG. 1 which is dictated by a movable stop 39 on the trip arm portion 32. This clockwise movement of the bell crank lever 24,26 returns the detent 21 to its original position of FIG. 1 and is re-engaged by the stop pawl 20 at the end of one revolution of the driven portion of the clutch 19, whereupon the clutch is disengaged and will remain so until next actuated by the metering means.

It has been found that here can be a variation in the timing of the recess 34 engaging the pinion 35 due to wear and/or sticking of the rack and pinion 33,35. As already explained, such a variation can result in the baler plunger undergoing either a further stroke and thus adding another wad of crop material to the otherwise completed bale and hence increasing the length of the latter, or one less stroke whereby the length of the bale will be less by one wad of crop material.

This problem is solved in accordance with the present invention by providing a freely rotatable roller 41 mounted on the trip arm 30 at the end of the rack 33 adjacent a cut-away portion 45 of the trip arm 30 and at the entrance to the recess 34. Preferably, the trip arm portion 32 is formed from a folded piece of sheet metal and the roller 41 is mounted therebetween on a pivot 42.

Figure 3:
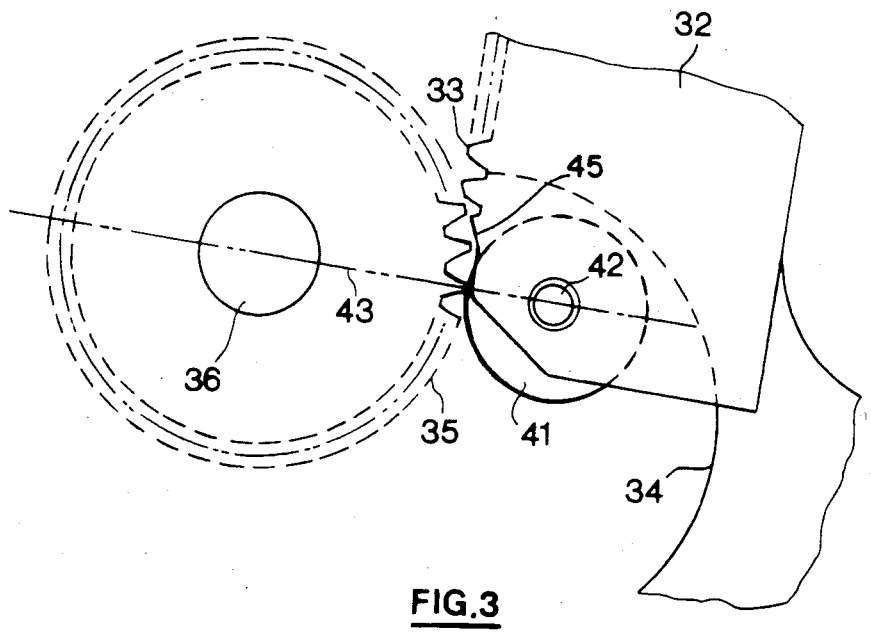
FIG. 3 is another enlarged detail view of a portion of FIG. 2.
Figure 2:
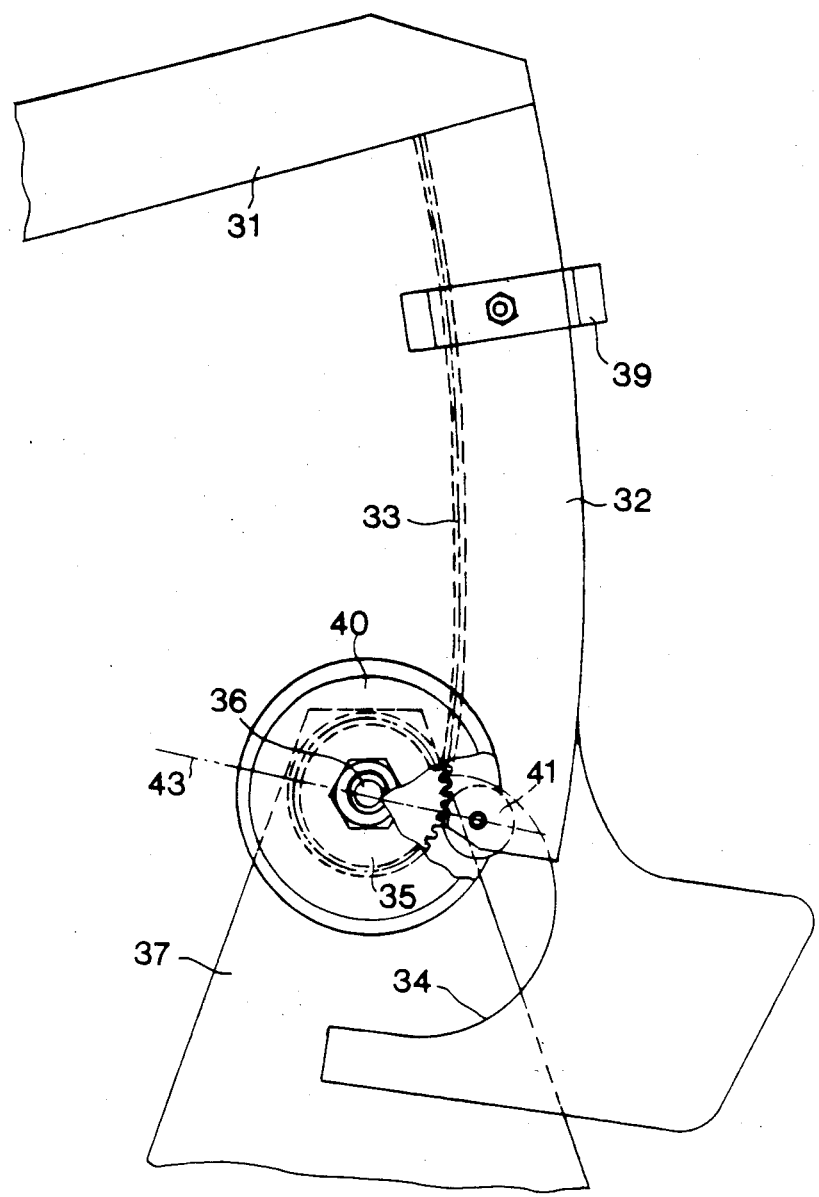
FIG. 2 is an enlarged detail view of a portion of FIG. 1.

It will be seen from FIG. 3 that the teeth of the rack 33 are cut away at 45 immediately preceding the roller 41 to ensure that there is no driving engagement between the rack 33 and the pinion 35 when the latter engages the roller 41 and after the roller 41 goes "overcenter". Thus there is nothing to delay engagement of the recess 34 with the pinion 35 when this point of relative positioning between the rack 33 and pinion 35 has been reached. The critical point is the point when the line 43 joining the axis of the pivot 27 and the axis of roller 41 passes through the axis of the pinion 35. When this line 43 rises above the axis of the pinion 35, the action of the spring 29 takes over and causes the trip arm recess 34 to snap into engagement with the pinion 35; the roller 41 rolling over the pinion teeth. It, therefore, is not only necessary that, as the center line 43 passes from one side of the axis of the pinion 35 to the other side thereof, the driving connection between the rack 33 and the pinion 35 is fully disengaged, but also that this driving connection is maintained for as long as centerline 43 is positioned to the one side of the axis of the pinion 35 to ensure that the roller 41 is positively moved "overcenter", i.e., that the centerline 43 is positively transferred to the other side of the axis of the pinion 35 so that the spring 29 can cause the trip mechanism to trip.

It has been found that the provision of the roller 41 ensures repeatability of operation of the metering means so that the length of each bale formed is substantially constant and is not varied by the baler plunger being allowed a further stroke before the securing means is actuated.

Instead of the roller 41 being positioned such that the point on the periphery thereof engaged by the pinion 35 is below the outer extremities of the teeth of the rack 33, it also may be positioned so that this point extends beyond the cut-away portion 45 of trip arm 30, thus again ensuring that the drive connection between the rack 33 and pinion 35 is broken positively when the recess is at the point to engage the pinion 35.

It should be noted that the precise form of driving connection between the trip arm 30 and the shaft 36 is immaterial and can be other than the illustrated rack 33 and pinion 35.

Figure 4:
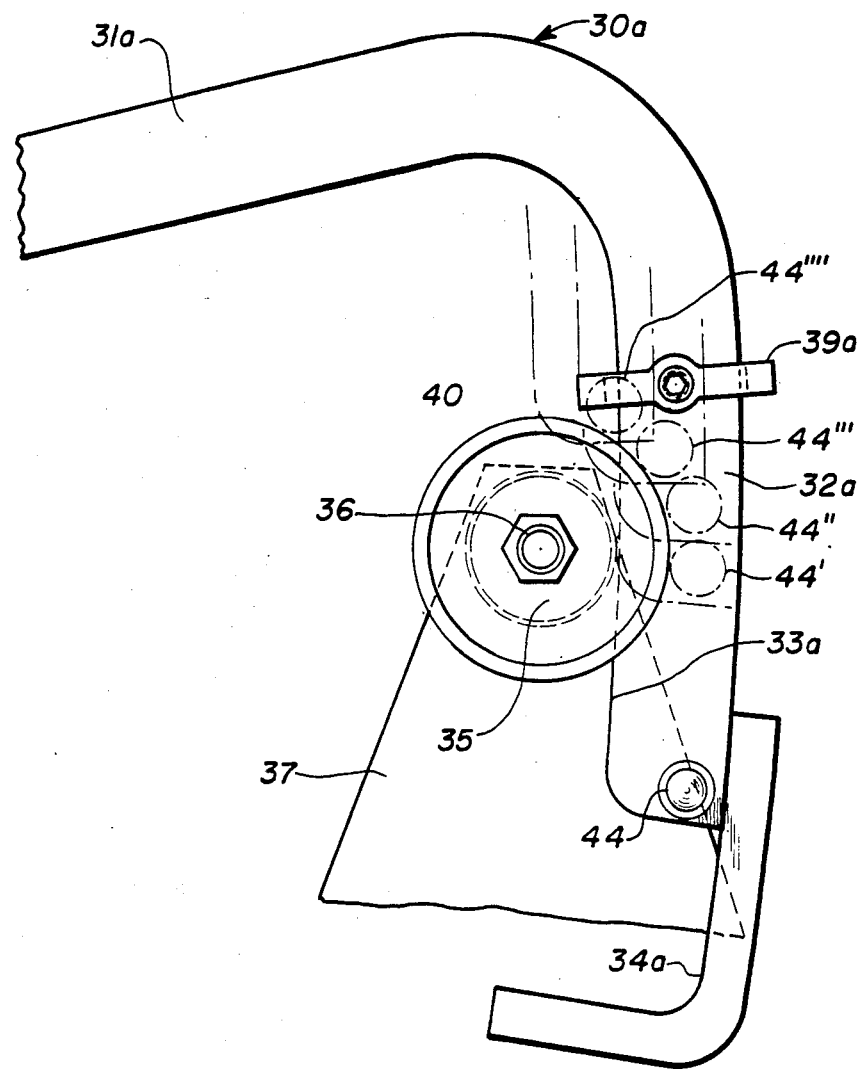
FIG. 4 is a view similar to FIG. 3 illustrating a prior art arrangement.

The prior art arrangement illustrated in FIG. 4 includes a trip arm 30a similar to trip arm 30 formed with a toothed rack 33a on one edge of the trip arm portion 32a and a notch or recess 34a located at the outer end of the trip arm portion 32a. A movable top 39a is provided on trip arm 30a, and a non-rotatable pin 44 is fixed to the trip arm 30a adjacent the notch 34a. During bale formation, the trip arm 30a is driven by engagement of the rack 33a with the pinion 35 until the notch 34a engages the pinion 35. The pin 44 contacts the pinion guide discs 40 as shown in phantom lines 44', 44''', 44'''', 44''''' in FIG. 4 to prevent engagement between the pinion 35 and the trip arm 30a as the pinion 35 enters the notch 34a.

Having thus described the invention, what is claimed is:

1. In a baler having means for securing a completed bale of material, metering means for triggering the operation of the securing means; the metering means including a pinion drivingly connectable with a rack formed on a trip arm so that relative driving movement between the trip arm and the pinion takes place until said pinion engages a recess formed in the trip arm at one end of the rack, at which point, operation of the securing means is triggered, the extent of said relative driving movement being representative of a dimension of the bale being formed, the improvement comprising:
- a roller mounted on the trip arm at the entry to the recess adjacent a cut-away portion of the trip arm for engaging said pinion when the pinion is at the point to enter said recess thereby breaking the driving connection between the pinion and the rack; and
- said cut-away portion being located at said one end of the rack thereby shortening the rack and causing the pinion to contact the roller prior to the pinion entering the recess to break the driving connection between the pinion and the rack before the securing means is triggered.

2. In a baler according to claim 1, wherein the roller has a point on the periphery thereof engageable by the pinion which protrudes beyond the cut-away portion of the trip arm so that the driving connection between the pinion and the rack is broken when the pinion engages the roller.

3. In a baler according to claim 2 wherein the trip arm has a pivotal coupling at one end to an arm of a bell crank which is part of a clutch mechanism and wherein spring means are provided for urging the trip arm in the direction toward driving engagement with the pinion, the roller is disposed relative to the trip arm surface such that at the point when a centerline joining the axis of the pivotal coupling of the trip arm to the bell crank and the axis of the roller passes from one side of the axis of the pinion to the other side thereof, said driving connection between the pinion and the trip arm is broken and the spring means takes over and causes the trip arm recess to snap into engagement with the pinion.

4. In a baler according to claim 1 wherein the roller is freely rotatable.

* * * * *